United States Patent
Lai et al.

(10) Patent No.: US 11,660,754 B2
(45) Date of Patent: May 30, 2023

(54) DETECTION SYSTEM AND DETECTION METHOD FOR SENSORS OF ROBOT

(71) Applicant: TECHMAN ROBOT INC., Taoyuan (TW)

(72) Inventors: Chun-Wen Lai, Taoyuan (TW); I-Bing Su, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 214 days.

(21) Appl. No.: 17/151,688

(22) Filed: Jan. 19, 2021

(65) Prior Publication Data
US 2021/0323155 A1    Oct. 21, 2021

(30) Foreign Application Priority Data

Apr. 20, 2020    (TW) .................................. 109113416

(51) Int. Cl.
*B25J 9/16*    (2006.01)

(52) U.S. Cl.
CPC .......... *B25J 9/1674* (2013.01); *B25J 9/1643* (2013.01)

(58) Field of Classification Search
CPC ...... B25J 9/1674; B25J 9/1643; B25J 9/1694; G05B 2219/37325; G05B 2219/42318; G05B 2219/42329
See application file for complete search history.

(56) References Cited

U.S. PATENT DOCUMENTS

| | | | |
|---|---|---|---|
| 10,976,209 B2 | 4/2021 | Murakami | |
| 2011/0202308 A1* | 8/2011 | Kishida | ..................... G01B 7/30 702/151 |
| 2014/0067124 A1* | 3/2014 | Williamson | ........... B25J 9/1694 700/258 |
| 2017/0243413 A1* | 8/2017 | Haggerty | ............. G07C 5/0808 |
| 2018/0306611 A1 | 10/2018 | Saitou | |
| 2019/0359253 A1 | 11/2019 | Kuramitsu | |
| 2020/0180689 A1* | 6/2020 | Asaka | ...................... G01D 3/08 |

FOREIGN PATENT DOCUMENTS

| CN | 107735658 A | 2/2018 |
|---|---|---|
| CN | 110268625 A | 9/2019 |
| TW | 201719128 A | 6/2017 |
| TW | 201946367 A | 12/2019 |

OTHER PUBLICATIONS

Triple modular redundancy, Wikipedia, Sep. 24, 2012, pp. 1-2, XP055706297, https://en.wikipedia.org/w/index.php?title=Triple_modular_redundancy&oldid=514315723.

* cited by examiner

*Primary Examiner* — Jonathan L Sample
*Assistant Examiner* — Elizabeth Rose Neleski
(74) *Attorney, Agent, or Firm* — Winston Hsu (57) ABSTRACT

A detection system and detection method for the sensors of a robot. A detection system installs three sensors at the motor side and power output terminal of the robot. A detection unit detects the normal or abnormal state of three sensors to index the abnormal sensor for maintenance, and two normal sensors are selected for keeping the robot safety operation without stop.

14 Claims, 5 Drawing Sheets

DETECTION SYSTEM AND DETECTION METHOD FOR SENSORS OF ROBOT

CROSS REFERENCE TO RELATED APPLICATION

This non-provisional application claims priority of Taiwan patent application No. 109113416, filed on 20 Apr. 2020, included herein by reference in its entirety.

BACKGROUND OF THE INVENTION

1. Field of the Invention

The present invention relates to a detection system and a detection method of a robot, in particular to a detection system and detection method for sensors calculating a safeguard function of a robot, and selecting a sensor operating properly to perform a safeguard operation.

2. Description of the Prior Art

Due to the rapid development of robotics, factories use collaborative robots to assist workers speeding up processing, assembly and manufacturing. While the collaborative robots can improve production efficiency, whether the robotic operations normal or not may affect the safety of the workers in a workplace, and consequently, enforcing safeguard of robotic operations constitutes a major part in safety standards in many countries.

U.S. Pat. No. 9,266,240 is related art disclosing that a first sensor is provided at the side of the driving motor of a robot to detect a rotation state of the driving motor. The robot also provides a second sensor at the power output terminal of the driving motor after a speed reduction mechanism to detect a rotation state after speed reduction. A control system receives a first detection signal from the first sensor and a second detection signal from the second sensor, computes safety functions separately, determines an operation state according to a computation result from any one of the first sensor signal or the second sensor signal, and ensures a safe operation by the dual circuit.

Another related art employs a speed reduction mechanism having a certain gear ratio. A first sensor detects a first detection signal indicative of the rotation of a driving motor, and a second sensor detects a second detection signal indicative of the rotation of the drive motor through the speed reduction mechanism. In a normal operation state, the first detection signal and the second detection signal show a ratio relationship corresponding to the gear ratio. If the normal ratio relationship between the first detection signal and the second detection signal is broken, it may be determined that the detection system is abnormal or malfunctioning. Upon detecting a system abnormality, a safeguard function of the robot operating according to the first detection signal from the first sensor or the second detection signal from the second sensor can no longer operate properly, being unable to maintain reliable monitoring of the robot. Therefore, a safety setting is initiated to bring the robot into an emergency stop, so as to prevent a collision and/or a damage of the robot, to maintain the safety of workers nearby and to perform a repairing task.

However, in the related art, the safety setting is activated immediately upon detecting an abnormal system, shutting down the robot, leading to an impact on the production efficiency of a factory. Further, the set of failed sensors cannot be identified when the system is abnormal, additional time will be needed to identify an invalid component and perform the repairing task, increasing repair costs. A detection system and detection method for robotic sensors is in need.

SUMMARY OF THE INVENTION

According to an embodiment of the invention, a detection system includes three sets of sensors disposed at a motor side and a power output terminal of a robot, and a computation unit used to detect and select two sets of normal sensors for ensuring the robot perform normally a safeguard dual-circuit operation, enhancing production efficiency.

According to another embodiment of the invention, a detection method of robotic sensors includes a detection unit of a detection system detecting operation states of three sets of sensors, indicating abnormal sets of sensors, and performing a repairing task immediately after shutdown, thereby enhancing a maintenance efficiency.

According to another embodiment of the invention, a detection method of robotic sensors includes when a detection unit of a detection system detects that two or more sets of sensors are abnormal and a safeguard operation of a dual circuit is no longer operating, turning off the power supply and shutting down the robot operation, so as to provide a safeguard operation.

In order to achieve the objectives of the invention, the detection system of the robotic sensors provides a first set of sensors at a motor side of a motor of a robot to detect a rotation state of the motor, and generate a first detection signal. A second set of sensors is disposed at a power output terminal of the motor, and is used to detect a rotation state of the power output terminal, and generate a second detection signal. A third set of sensors is optionally disposed at the motor side or the power output terminal, and is used to detect the rotation state of the motor or the power output terminal, and generate a third detection signal. A control system includes a detection unit used to receive the first detection signal, the second detection signal and the third detection signal, detect whether the first set of sensors, the second set of sensors and the third set of sensors are in a normal operation state or in an abnormal operation state, and select two sets of sensors in the normal operation state for use, a remaining set of sensors serving as backup sensors for use upon detecting one of the two sets of sensors in use being in the abnormal operation state. When the first set of sensors, the second set of sensors and the third set of sensors are in the abnormal operation state, the control system is used to issue and display a notification for maintaining abnormal sensors.

The detection method of the robotic sensor for implementing a detection operation includes reading three sets of detection signals generated by a first set of sensors and a third set of sensors at a motor side of a motor, and a second set of sensors at a power output terminal, converting the three sets of detection signals into a first angle, a second angle and a third angle of the motor in rotation, arranging the first angle, the second angle and the third angle in a descending order, with large angle a>medium angle b> small angle c, computing an angle difference $D1=a-b$ and an angle difference $D2=b-c$, if it is determined that a difference between the angle differences is less than a first predetermined standard deviation C1, that is, $(D1-D2)<C1$, determining that the first set of sensors, the second set of sensors and the third set of sensors are all normal.

If the difference between the angle differences is not less than the first predetermined standard deviation C1, determine whether the difference between the angle differences is between the first predetermined standard deviation C1 and a second predetermined standard deviation C2, that is, C1<(D1−D2)<C2, and D1>D2, and if not, determine whether the difference between the angle differences is between the predetermined first standard deviation C1 and the second standard deviation C2, that is, C1<(D1−D2)<C2, and D1<=D2, and if so, determine that two or more sets of sensors are abnormal, turn off a power to the robot, and shut down operations. If the difference between the angle differences is between the first predetermined standard deviation C1 and the second predetermined standard deviation C2, that is, C1<(D1−D2)<C2, and D1<=D2, determining whether the medium angle b is the first angle and whether the large angle a is the second angle, and if so, determining the first set of sensors and the second set of sensors are normal, but the third set of sensors is abnormal. If the large angle a is not the second angle but the third angle, determine that the first set of sensors and the third set of sensors are normal, but the second set of sensors is abnormal.

If the medium angle b is not the first angle but the second angle, determine whether the large angle a is the first angle, and if so, determine that the first set of sensors and the second set of sensors are normal, but the third set of sensors is abnormal. If the large angle a is not the first angle but the third angle, determine that the second set of sensors and the third set of sensors are normal, but the first set of sensors is abnormal. If the medium angle b is not the second angle but the third angle, determine whether the large angle a is the first angle, and if so, determine that the first set of sensors and the third set of sensors are normal, but the second set of sensors is abnormal. If the large angle a is not the first angle but the second angle, determine that the second set of sensors and the third set of sensors are normal, but the first set of sensors is abnormal.

If the difference between the angle differences is not less than the first predetermined standard deviation C1, determine whether the difference between the angle differences is between the first predetermined standard deviation C1 and the second predetermined standard deviation C2, that is, C1<(D1−D2)<C2, and D1>D2, and if so, determine whether the medium angle b is the first angle P1 and the large angle a is the second angle P2, and if so, determine that the first set of sensors and the third set of sensors are normal, but the second set of sensors is abnormal. If the large angle a is not the second angle but the third angle, determine that the first set of sensors and the second set of sensors are normal, but the third set of sensors is abnormal. If the medium angle b is not the first angle but the second angle, determine whether the large angle a is the first angle, and if so, determine that the second set of sensors and the third set of sensors are normal, but the first set of sensors is abnormal. If the large angle a is not the first angle but the third angle, determine that the first set of sensors and the third set of sensors are normal, but the second set of sensors is abnormal.

If the medium angle b is not the second angle but the third angle, determine whether the large angle a is the first angle, and if so, determine that the second set of sensors and the third set of sensors are normal, but the first set of sensors is abnormal. If the large angle a is not the first angle but the second angle, determine that the first set of sensors and the third set of sensors are normal, but the second set of sensors is abnormal.

The detection method of the robotic sensors includes reading detection signals of three sets of sensors disposed at a motor side of a motor and a power output terminal, indicating that the three sets of sensors are abnormal and notify of maintenance when it is detected that the three sets of sensors are abnormal, and when the set of abnormal sensors is in use, replacing the set of abnormal sensors with a set of backup sensors, so as to continue to operate a robot normally. When the set of abnormal sensors is not in use, continue to operate the robot normally. Upon detecting that two or more sets of sensors are abnormal, turn off the power of the robot, and shut down operations of the robot. When the three sets of sensors are normal, select a set of sensors to be used at each of the motor side and the power output terminal, and select the remaining set of sensor as a backup, and continue to operate the robot normally.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
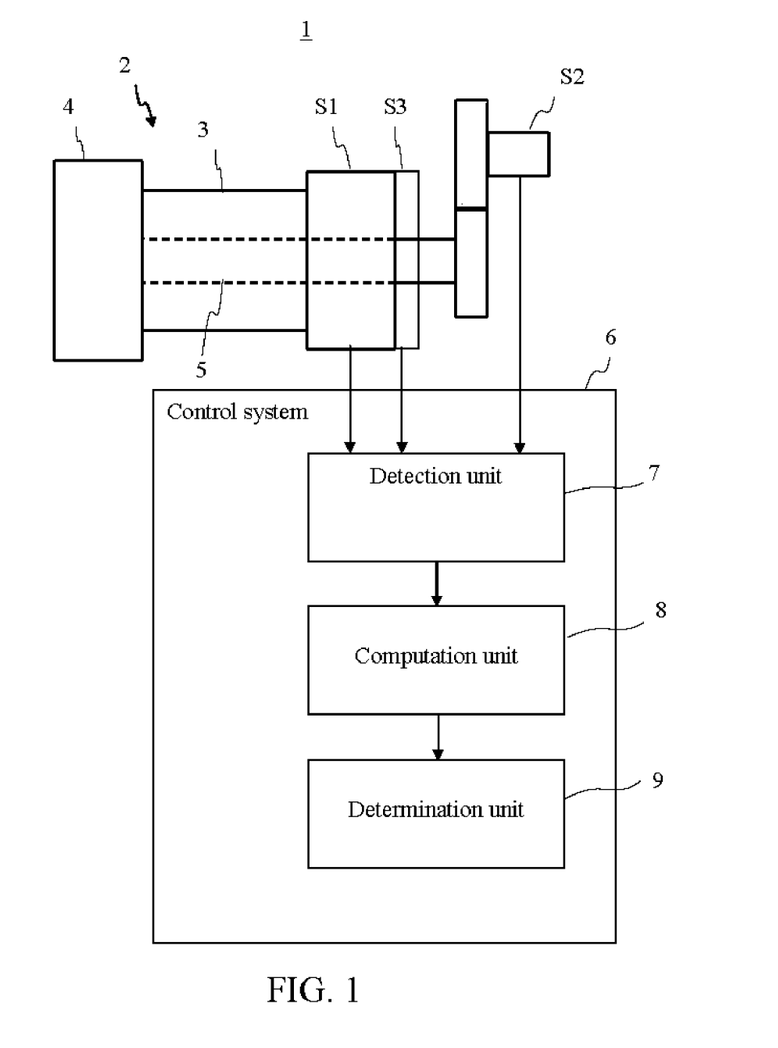
FIG. 1 is a functional block diagram of a robotic detection system according to an embodiment of the invention.

FIG. 1 is a functional block diagram of a robotic detection system according to an embodiment of the invention. In FIG. 1, the detection system 1 of the invention provides a first set of sensors S1 at a motor side of a motor 3 of a robot drive module 2 to detect a rotation state of the motor 3 and generate a first detection signal. The power of the motor 3 is transmitted to a power output terminal through the hollow of motor 3 by a speed reduction mechanism 4 via a transmission shaft 5. A second set of sensors S2 is arranged at the power output terminal to detect the rotation state and generate a second detection signal. A third set of sensors S3 of the detection system 1 is arranged at the motor side of the motor 3 and generates a third detection signal. However, the arrangement of the third set of sensors S3 is not limited to that in the embodiment, and may also be optionally arranged at the motor side or the power output terminal. Regardless of being arranged at the motor side or the power output terminal, the transmission relation leads to a similar rotational relation between the third set of sensors S3 and the first set of sensors S1 or the second set of sensors S2.

The detection system 1 of the present invention further includes a control system 6 having a detection unit 7. The detection unit 7 receives the detection signals from the first set of sensor S1, the second set of sensor S2 and the third set of sensor S3 to detect an operation state of the three sets of sensors as normal or abnormal. When the detection unit 7 detects that the three sets of sensors are operating normally, two sets of normal sensors are selected for use, and the remaining set of normal sensors is set as backup sensors. The control system 6 further includes a computation unit 8 and a determination unit 9. The computation unit 8 receives the detection signals of the two sets of normal sensors selected by the detection unit 7 for a dual circuit to compute constraints of the robot such as a speed, a moving distance, and/or a range of rotation, so as to provide safeguard functions. The computation unit 8 then transmits the computed values of the safeguard functions to the determination unit 9, and the determination unit 9 compares the same to predetermined values. When the computed values of the safeguard functions exceed the predetermined values, the control system 6 is notified to activate a safeguard setting to prevent the robot from a collision, and ensure the safety of workers nearby.

When the robot uses two sets of normal sensors to ensure the safeguard operation of the dual circuit, if the detection unit 7 detects any one of the two sets of sensors in use being abnormal, the detection unit 7 will immediately replace the set of abnormal sensors with the backup sensors for the robot to continue to maintain the safeguard operation of the dual circuit, and the control system 6 issues and displays a notification of the set of abnormal sensors without shutting down the robot. After the job is completed, the set of abnormal sensors may be repaired upon shutting down the robot, preventing the production efficiency from being affected.

Figure 2:
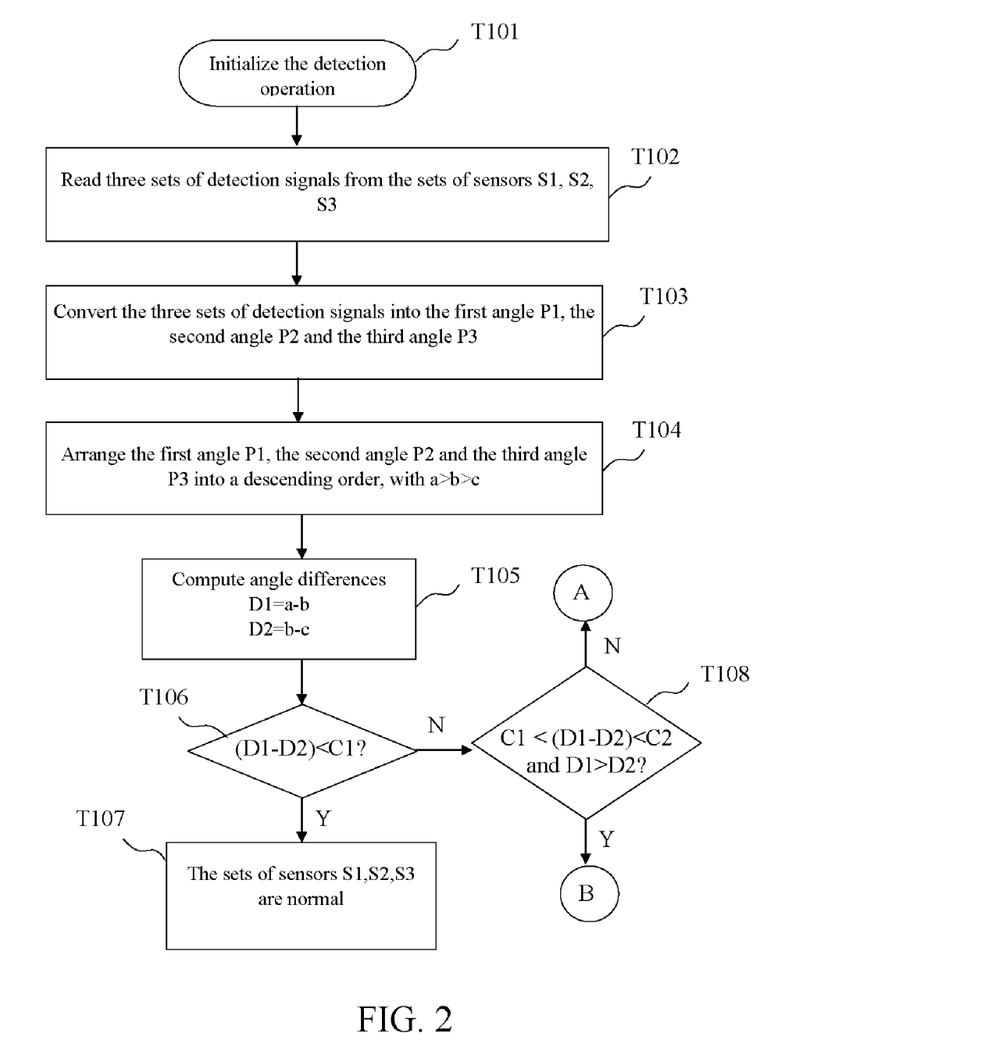
FIG. 2 is a flowchart of a detection operation of the detection unit according to an embodiment of the invention.
Figure 3:
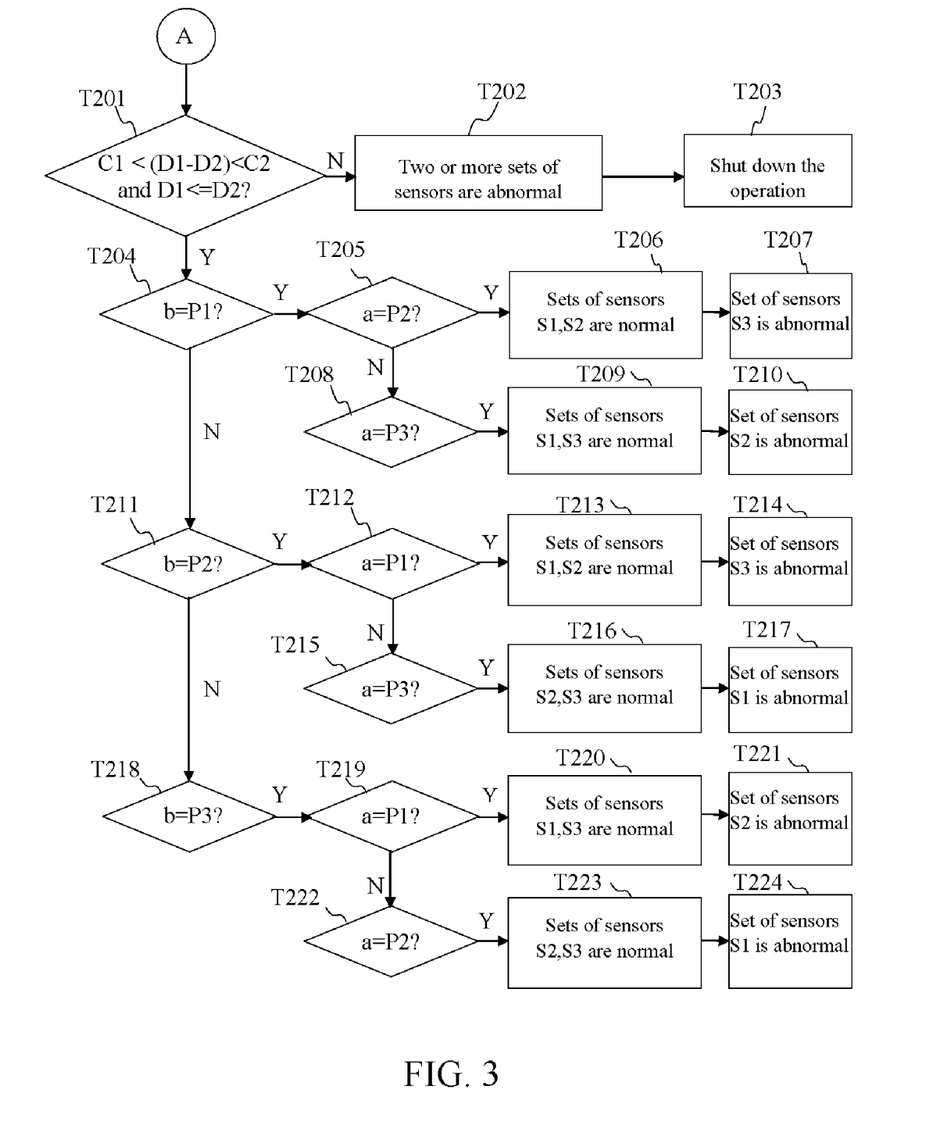
FIG. 3 is a flowchart of a side-branch flow A of the detection operation according to an embodiment of the present invention.
Figure 4:
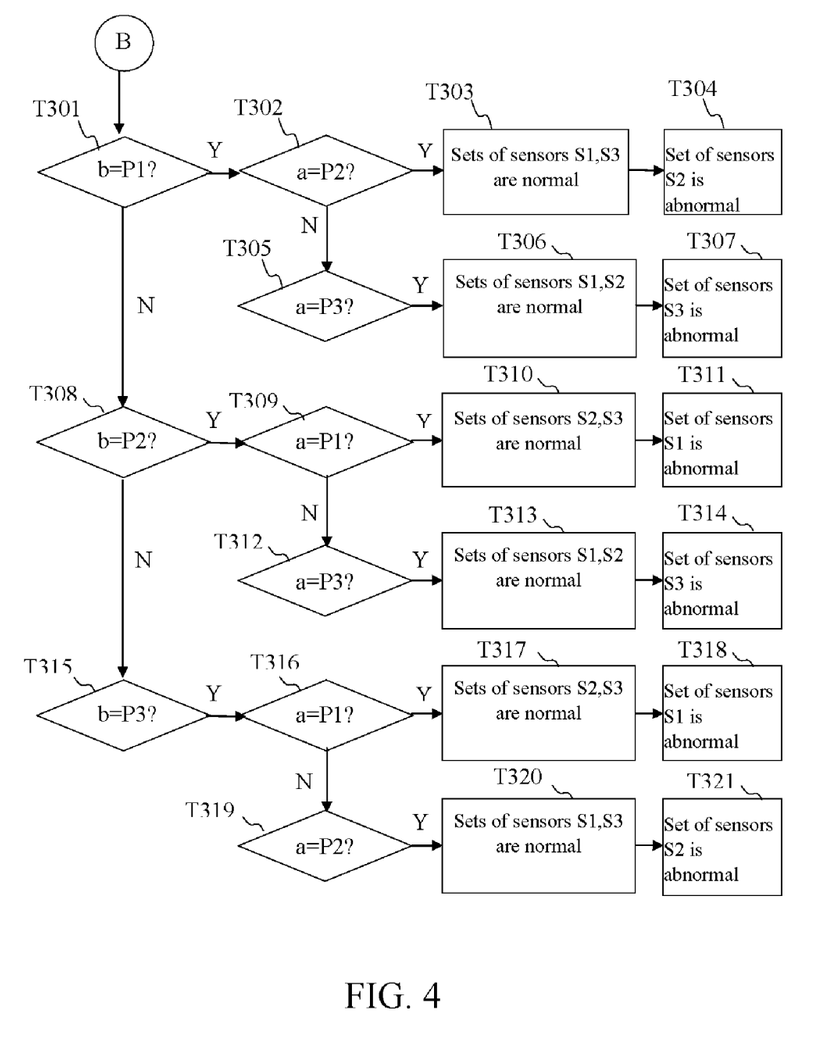
FIG. 4 is a flowchart of a side-branch flow B of the detection operation according to an embodiment of the present invention.

Please refer to FIGS. 2, 3 and 4. FIG. 2 is a flowchart of a detection operation according to an embodiment of the invention, FIG. 3 is a flowchart of a side-branch flow A of the detection operation according to an embodiment of the present invention, and FIG. 4 is a side-branch flow B of the detection operation according to an embodiment of the present invention. In FIG. 2, Steps of the detection operation utilizing the robotic sensors of the present invention are detailed as follows: in Step T101, the detection unit 7 initializes the detection operation; in Step T102, read the three sets of detection signals from the first set of sensor S1 and the third set of sensors S3 at the motor side and the second set of sensors S2 at the power output terminal; in Step T103, convert the three sets of detection signals into the first angle P1, the second angle P2 and the third angle P3 of the rotating motor, respectively; in Step T104, arrange the first angle P1, the second angle P2 and the third angle P3 into a descending order, with large angle a>medium angle b>small angle c.

Next in Step T105, compute an angle difference D1=a−b and an angle difference D2=b−c; in Step T106, determine whether a difference between the angle differences is less than a first predetermined standard deviation C1 (criterion), that is, (D1−D2)<C1? When the difference between the angle differences is less than the first predetermined standard deviation C1, go to Step T107, and the first set of sensors S1, the second set of sensors S2 and the third set of sensors S3 are all normal. When the difference between the angle differences is not less than the first predetermined standard deviation C1, go to Step T108, and then determine whether the difference between the angle differences is between the first predetermined standard deviation C1 and the second predetermined standard deviation C2, that is, C1 <(D1−D2) <C2 and D1>D2? If so, go to the side-branch flow B, and if not, go to the side-branch flow A.

FIG. 3 shows the side-branch flow A of the detection operation of the detection unit of the present invention, in Step T201, determine whether the difference between the angle differences is between the first predetermined standard deviation C1 and the second predetermined standard deviation C2, that is, C1<(D1−D2)<C2 and D1<=D2? If not, go to Step T202 and determine that two or more set of sensors are abnormal, and then proceed to Step T203 to turn off the power of the robot and shut down operations of the robot.

When the determination result in Step T201 is true, go to Step T204, and determine whether the medium angle b is the first angle P1? When the medium angle b is the first angle P1, go to Step T205, and then determine whether the large angle a is the second angle P2? When the large angle a is the second angle P2, go to Step T206 and determine that the first set of sensors S1 and the second set of sensors S2 are normal, and then go to Step T207 and determine that the third set of sensors S3 is abnormal. When the large angle a is not the second angle P2 in Step T205, go to Step T208, and then determine whether the large angle a is the third angle P3? When the large angle a is the third angle P3, go to Step T209 and determine that the first set of sensors S1 and the third set of sensors S3 are normal, and then go to Step T210 and determine that the second set of sensors S2 is abnormal.

In Step T204, when the medium angle b is not the first angle P1, then go to Step T211, determine whether the medium angle b is the second angle P2? When the medium angle b is the second angle P2, in Step T212, determine whether the large angle a is the first angle P1? When the large angle a is the first angle P1, go to Step T213 and determine that the first set of sensors S1 and the second set of sensors S2 are normal, and then go to Step T214 and determine that the third set of sensors S3 is abnormal. When the large angle a is not the first angle P1 in Step T212, go to Step T215, and then determine whether the large angle a is the third angle P3? When the large angle a is the third angle P3, go to Step T216 and determine that the second set of sensors S2 and the third set of sensors S3 are normal, and then go to Step T217 and determine that the first set of sensors S1 is abnormal.

In Step T211, when the medium angle b is not the second angle P2, then go to Step T218, determine whether the medium angle b is the third angle P3? When the medium angle b is the third angle P3, in Step T219, determine whether the large angle a is the first angle P1? When the large angle a is the first angle P1, go to Step T220 and determine that the first set of sensors S1 and the third set of sensors S3 are normal, and then go to Step T221 and determine that the second set of sensors S2 is abnormal. When the large angle a is not the first angle P1 in Step T219, go to Step T222, and then determine whether the large angle a is the second angle P2? When the large angle a is the second angle P2, go to Step T223, then determine that the second set of sensors S2 and the third set of sensors S3 are normal, and then go to Step T224 and determine that the first set of sensors S1 is abnormal.

FIG. 4 shows the side-branch flow B of the detection operation of the detection unit of the present invention. In Step T301, determine whether the medium angle b is the first angle P1? When the medium angle b is the first angle P1, go to Step T302, and then determine whether the large angle a is the second angle P2? When the large angle a is the second angle P2, go to Step T303 and determine that the first set of sensors S1 and the third set of sensors S3 are normal, and then go to Step T304, and determine that the second set of sensors S2 is abnormal. When the large angle a is not the second angle P2 in Step T302, go to Step T305, and then determine whether the large angle a is the third angle P3? When the large angle a is the third angle P3, go to Step T306 and determine that the first set of sensors S1 and the second set of sensors S2 are normal, and then go to Step T307 and determine that the third set of sensors S3 is abnormal.

In Step T301, when the medium angle b is not the first angle P1, then go to Step T308, and then determine whether the medium angle b is the second angle P2? When the medium angle b is the second angle P2, in Step T309, determine whether the large angle a is the first angle P1? When the large angle a is the first angle P1, go to Step T310 and determine that the second set of sensors S2 and the third set of sensors S3 are normal, and then go to Step T311 and determine that the first set of sensors S1 is abnormal. When the large angle a is not the first angle P1 in Step T309, go to Step T312, and then determine whether the large angle a is the third angle P3? When the large angle a is the third angle P3, go to Step T313 and determine that the first set of sensors S1 and the second set of sensors S2 are normal, and then go to Step T314 and determine that the third set of sensors S3 is abnormal.

In Step T308, when the medium angle b is not the second angle P2, then go to Step T315, determine whether the medium angle b is the third angle P3? When the medium angle b is the third angle P3, in Step T316, determine whether the large angle a is the first angle P1? When the large angle a is the first angle P1, go to Step T317 and determine that the second set of sensors S2 and the third set of sensors S3 are normal, and then go to Step T318, and determine that the first set of sensors S1 is abnormal. When the large angle a is not the first angle P1 in Step T316, go to Step T319, and then determine whether the large angle a is the second angle P2? When the large angle a is the second angle P2, go to Step T320 and determine that the first set of sensors S1 and the third set of sensors S3 are normal, and then go to Step T321 and determine that the second set of sensors S2 is abnormal.

Figure 5:
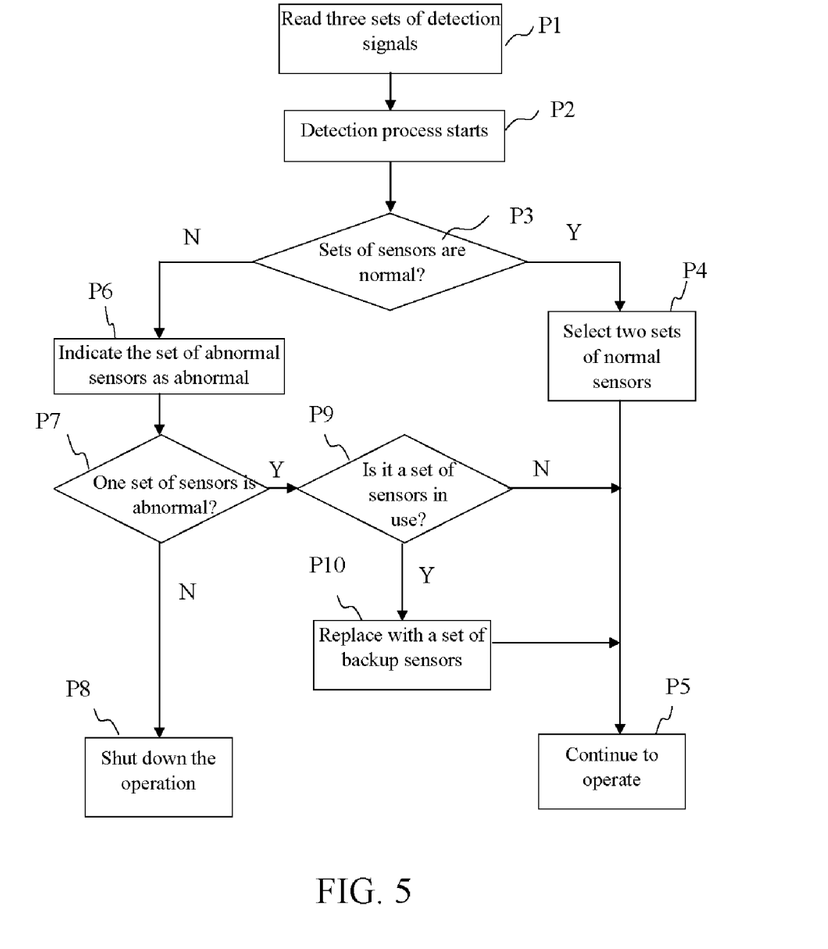
FIG. 5 is a flowchart of a detection method of robotic sensors according to an embodiment of the invention.

FIG. 5 is a flowchart of a detection method utilizing the robotic sensors according to an embodiment of the present invention. Steps of the detection method utilizing the robotic sensors of the present invention are detailed as follows: In Step P1, initialize the detection operation of the robotic sensors, and read the detection signals of the three sets of sensors arranged at the motor side and the power output terminal. In Step P2, the detection unit performs a detection operation. In Step P3, determine whether the three sets of sensors are all normal? When the three sets of sensors are all normal, the detection operation proceeds to Step P4, select a set of normal sensors at the motor side and a set of normal sensors at the power output terminal for use, and select the remaining set of sensor for backup, and then proceeds to Step P5, continue to operate the robot normally. Upon detecting that two or more sets of sensors are abnormal, turn off the power of the robot, and shut down operations of the robot, so as to ensure operation safety. Upon detecting that a set of sensors is abnormal, select the remaining two sets of normal sensors for use without shutting down the robot, and indicate which set of the sensors is abnormal in order to repair the set of abnormal sensors after the job is completed and the robot is shut down.

When it is detected that the three sets of sensors are not all normal in Step P3, proceed to Step P6, indicate the set of abnormal sensors as abnormal, and notify of a need for maintenance; in Step P7, determine whether one set of sensors is indicated as abnormal? When more than one set of sensors is indicated as abnormal, proceed to Step P8. Since two or more sets of sensors are abnormal, only one set of sensors is normal and cannot maintain the safeguard dual-circuit operation, the robot is required to be turned off and shut down; when it is detected in Step P7 that one set of sensors is indicated as abnormal, go to Step P9 to determine whether it is the set of sensors in use? When it is not the set of sensors in use, proceed to Step P5 to continue to operate the robot normally. When it is the set of sensors in use, proceed to Step P10 to replace the set of abnormal sensors in use with the backup sensors, then go to Step P5 to continue to operate the robot normally.

Therefore, the robotic sensors of the present invention may construct the detection system by arranging three sets of sensors at the motor side and the power output terminal of the robot, and using the detection unit to detect the three sets of sensors are in a normal or abnormal state, selecting two sets of normal sensors for use to maintain the robot to perform a safeguard dual-circuit operation, achieving an enhanced production efficiency without a shutdown. The abnormal sensor is indicated as abnormal and repaired immediately after shutdown, achieving an increase in maintenance efficiency. In addition, when the detection unit of the detection system detects abnormalities of two or more sets of sensors and can no longer maintain the safeguard operation of the dual circuit, the power supply is turned off to shut down the robot operation, so as to ensure a safeguard robot operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection method of robotic sensors comprising:
    initializing a detection operation;
    reading three sets of detection signals generated by a first set of sensors and a third set of sensors at a motor side of a motor, and a second set of sensors at a power output terminal;
    converting the three sets of detection signals into a first angle, a second angle and a third angle of the motor in rotation;
    arranging the first angle, the second angle and the third angle in a descending order, with large angle a>medium angle b>small angle c;
    computing an angle difference D1=a−b and an angle difference D2=b−c;
    if a difference between the angle differences is less than a first predetermined standard deviation C1, that is, (D1−D2)<C1, determining that the first set of sensors, the second set of sensors and the third set of sensors are all normal;
    if the difference between the angle differences is not less than the first predetermined standard deviation C1, determining at least one member of a group comprising the first set of sensors, the second set of sensors and the third set of sensors is abnormal;
    when the abnormal set of sensors is not in use, continuing to operate the robot normally; and upon detecting two or more sets of sensors being abnormal, turning off a power of the robot, and shutting down operations of the robot.

2. The detection method of claim 1, further comprising if the difference between the angle differences is not less than the first predetermined standard deviation C1, determining whether the difference between the angle differences is between the first predetermined standard deviation C1 and a second predetermined standard deviation C2, that is, C1<(D1−D2)<C2, and D1>D2, and if not, determining whether the difference between the angle differences is between the predetermined first standard deviation C1 and the second predetermined standard deviation C2, that is, C1<(D1−D2)<C2, and D1<=D2, and if so, determining that two or more sets of sensors are abnormal, turning off a power of the robot, and shutting down operations.

3. The detection method of claim 2, further comprising if the difference between the angle differences is between the first predetermined standard deviation C1 and the second predetermined standard deviation C2, that is, $C1<(D1-D2)<C2$, and $D1<=D2$, determining whether the medium angle b is the first angle P1 and whether the large angle a is the second angle P2, and if so, determining the first set of sensors and the second set of sensors are normal, but the third set of sensors is abnormal.

4. The detection method of claim 3, further comprising if the large angle a is not the second angle, and the large angle a is the third angle, determining that the first set of sensors and the third set of sensors are normal, but the second set of sensors is abnormal.

5. The detection method of claim 3, further comprising if the medium angle b is not the first angle but the second angle, determining whether the large angle is the first angle, and if so, determining that the first set of sensors and the second set of sensors are normal, but the third set of sensors is abnormal.

6. The detection method of claim 5, further comprising if the large angle a is not the first angle but the third angle, determining that the second set of sensors and the third set of sensors are normal, but the first set of sensors is abnormal.

7. The detection method of claim 5, further comprising if the medium angle b is not the second angle but the third angle, determining whether the large angle a is the first angle, and if so, determining that the first set of sensors and the third set of sensors are normal, but the second set of sensors is abnormal.

8. The detection method of claim 7, further comprising if the large angle a is not the first angle but the second angle, determining that the second set of sensors and the third set of sensors are normal, but the first set of sensors is abnormal.

9. The detection method of claim 1, further comprising if the difference between the angle differences is not less than the first predetermined standard deviation C1, determining whether the difference between the angle differences is between the first predetermined standard deviation C1 and the second predetermined standard deviation C2, that is, $C1<(D1-D2)<C2$, and $D1>D2$, and if so, determining whether the medium angle b is the first angle and the large angle a is the second angle, and if so, determining that the first set of sensors and the third set of sensors are normal, but the second set of sensors is abnormal.

10. The detection method of claim 9, further comprising if the large angle a is not the second angle but the third angle, determining that the first set of sensors and the second set of sensors are normal, but the third set of sensors is abnormal.

11. The detection method of claim 9, further comprising if the medium angle b is not the first angle but the second angle, determining whether the large angle a is the first angle, and if so, determining that the second set of sensors and the third set of sensors are normal, but the first set of sensors is abnormal.

12. The detection method of claim 11, further comprising if the large angle a is not the first angle but the third angle, determining that the first set of sensors and the second set of sensors are normal, but the third set of sensors is abnormal.

13. The detection method of claim 11, further comprising if the medium angle b is not the second angle but the third angle, determining whether the large angle a is the first angle, and if so, determining that the second set of sensors and the third set of sensors are normal, but the first set of sensors is abnormal.

14. The detection method of claim 13, further comprising if the large angle a is not the first angle but the second angle, determining that the first set of sensors and the third set of sensors are normal, but the second set of sensors is abnormal.

* * * * *